(12) United States Patent
Kim

(10) Patent No.: US 9,503,630 B2
(45) Date of Patent: Nov. 22, 2016

(54) METHOD OF EXECUTING FAST ASSOCIATION FUNCTION OF CAMERA AND PORTABLE DEVICE INCLUDING THE SAME

(75) Inventor: Jung Hyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 457 days.

(21) Appl. No.: 13/248,267

(22) Filed: Sep. 29, 2011

(65) Prior Publication Data

US 2012/0092509 A1    Apr. 19, 2012

(30) Foreign Application Priority Data

Oct. 13, 2010   (KR) .................. 10-2010-0099749

(51) Int. Cl.
| | | |
|---|---|---|
| H04N 5/232 | (2006.01) | |
| G06F 3/0484 | (2013.01) | |
| H04N 1/32 | (2006.01) | |
| H04N 1/00 | (2006.01) | |
| G06F 3/0481 | (2013.01) | |
| G06F 3/0488 | (2013.01) | |
| G06F 3/0482 | (2013.01) | |

(52) U.S. Cl.
CPC ........ *H04N 5/23216* (2013.01); *G06F 3/0482* (2013.01); *G06F 3/0488* (2013.01); *G06F 3/04817* (2013.01); *G06F 3/04845* (2013.01); *H04N 1/0097* (2013.01); *H04N 1/00413* (2013.01); *H04N 1/00482* (2013.01); *H04N 1/32037* (2013.01); *H04N 1/32048* (2013.01); *H04N 1/32064* (2013.01); *H04N 1/0044* (2013.01); *H04N 1/00307* (2013.01); *H04N 2201/0084* (2013.01)

(58) Field of Classification Search
USPC ............... 348/333.01–333.13, 211.1–211.14; 396/56–59
See application file for complete search history.

(56) References Cited

U.S. PATENT DOCUMENTS

| | | | |
|---|---|---|---|
| 7,868,920 B2 * | 1/2011 | Leem | 348/220.1 |
| 2003/0210331 A1 * | 11/2003 | Battles et al. | 348/211.2 |
| 2004/0267793 A1 | 12/2004 | Sato | |
| 2005/0063613 A1 | 3/2005 | Casey et al. | |
| 2006/0268122 A1 * | 11/2006 | Iwasaki et al. | 348/231.3 |
| 2007/0192741 A1 | 8/2007 | Yoritate et al. | |
| 2008/0052945 A1 * | 3/2008 | Matas et al. | 34/173 |
| 2009/0003797 A1 * | 1/2009 | Nash | 386/95 |
| 2009/0023472 A1 * | 1/2009 | Yoo et al. | 455/556.1 |
| 2009/0303373 A1 * | 12/2009 | Yamada | 348/333.02 |
| 2010/0007755 A1 * | 1/2010 | Lee | 348/222.1 |
| 2010/0011304 A1 * | 1/2010 | van Os | 715/762 |

(Continued)

FOREIGN PATENT DOCUMENTS

| | | |
|---|---|---|
| CN | 1291758 A | 4/2001 |
| CN | 1577331 A | 2/2005 |

(Continued)

*Primary Examiner* — Christopher K Peterson
(74) *Attorney, Agent, or Firm* — Jefferson IP Law, LLP

(57) ABSTRACT

A portable device and a method of executing the fast association function of a camera are provided. The method includes activating the camera, capturing a gathering image using the camera, activating a user function registered as an associated function of the camera when the gathering image is captured, and performing the registered user function based on the gathering image.

19 Claims, 7 Drawing Sheets

(56) References Cited

U.S. PATENT DOCUMENTS

| | | | |
|---|---|---|---|
| 2010/0214420 A1* | 8/2010 | Yoshida | 348/207.1 |
| 2011/0043643 A1* | 2/2011 | Yu | H04N 1/00209 |
| | | | 348/207.1 |
| 2011/0050975 A1* | 3/2011 | Chung | 348/333.02 |
| 2011/0096195 A1* | 4/2011 | Nagoya | 348/231.3 |
| 2012/0274796 A1* | 11/2012 | Choi et al. | 348/220.1 |

FOREIGN PATENT DOCUMENTS

| | | |
|---|---|---|
| CN | 1658627 A | 8/2005 |
| CN | 1866210 A | 11/2006 |
| CN | 1951106 A | 4/2007 |
| CN | 101316423 A | 12/2008 |
| CN | 101600052 A | 12/2009 |
| WO | 2009/004515 A1 | 1/2009 |

* cited by examiner

FIG. 4
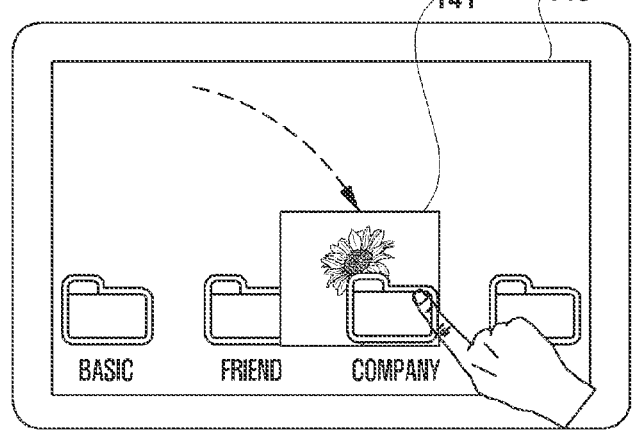
< 401 >
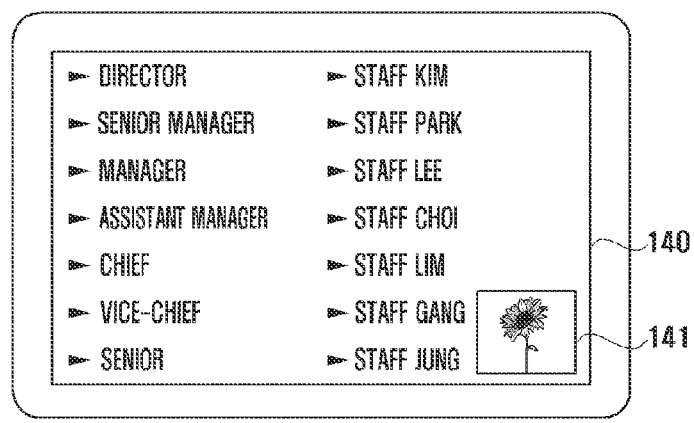
< 403 >
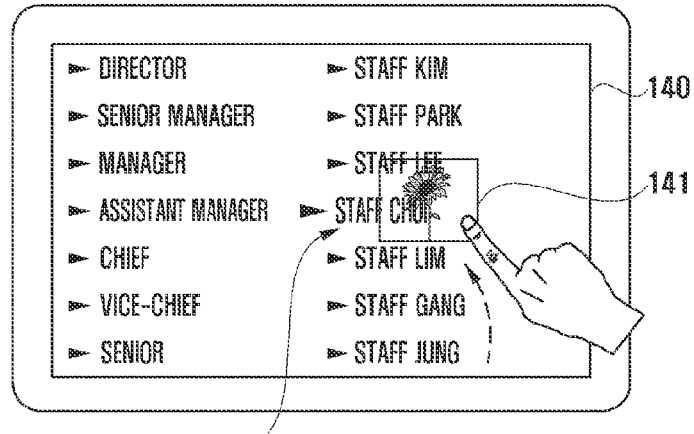
< 405 >

FIG. 7
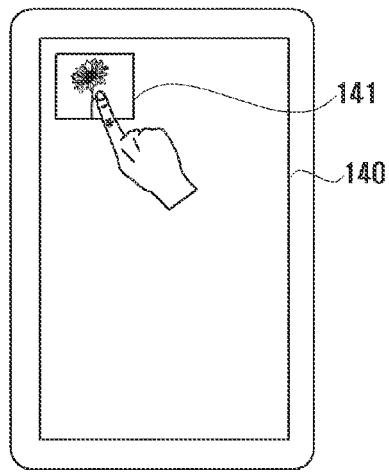
< 701 >
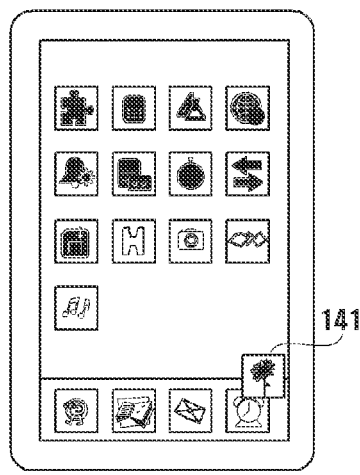
< 703 >
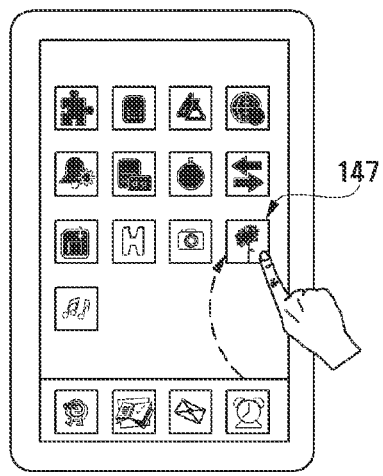
< 705 >

METHOD OF EXECUTING FAST ASSOCIATION FUNCTION OF CAMERA AND PORTABLE DEVICE INCLUDING THE SAME

PRIORITY

This application claims the benefit under 35 U.S.C. §119(a) of a Korean patent application filed on Oct. 13, 2010 in the Korean Intellectual Property Office and assigned Serial No. 10-2010-0099749, the entire disclosure of which is hereby incorporated by reference.

BACKGROUND OF THE INVENTION

1. Field of the Invention

The present invention relates to a portable device. More particularly, the present invention relates to a method of executing the fast association function of a camera and a portable device including the same, in which a user function supported by the portable device can be executed more rapidly and conveniently according to a gathering image captured by the camera of the portable device.

2. Description of the Related Art

A portable device is a device supporting a variety of user functions and is widely used because of its convenience and portability. Various modules for supporting the user functions are included in the portable device. For example, a music player module for playing music files and a camera module for an image gathering function may be included in the portable device. A camera module is included on many portable devices currently available.

Portable devices having a camera module support a preview function for outputting an image, gathered through the camera module, to a display unit, and a storage function for storing the gathering image at the request of a user. The camera function of the portable device, however, supports only a function of automatically storing a captured image with almost no function used by a user or only a function of enabling a user to store a captured image or to cancel the storage of the captured image. In order to utilize the various user functions of the portable device in association with a captured image, the user must store the captured image, search for a folder in which the captured image is stored, and select the stored image in the relevant folder. Accordingly, there are problems in that a function related to the camera is rarely used and it is inconvenient to use these related functions.

Portable devices providing a wider display unit than conventional portable devices, such as portable devices (e.g., smart phones and tablets such as the Galaxy Tab produced by Samsung Electronics Co., Ltd.), are on the market. Accordingly, there is an urgent need for the development of more user-friendly and useful functions by utilizing the wider display unit and the camera function.

SUMMARY OF THE INVENTION

Aspects of the present invention are to address at least the above-mentioned problems and/or disadvantages and to provide at least the advantages described below. Accordingly, an aspect of the present invention is to provide a method of executing the fast association function of a camera and a portable device including the same, in which the user functions of the portable device can be utilized rapidly and conveniently on the basis of an image captured by the camera.

In accordance with an aspect of the present invention, a method of executing the fast association function of a camera is provided. The method includes activating the camera, capturing a gathering image using the camera, activating a user function registered as an associated function of the camera when the gathering image is captured, and performing the registered user function based on the gathering image.

In accordance with another aspect of the present invention, a portable device supporting the execution of the fast association function of a camera is provided. The portable device includes the camera for capturing an image and providing a gathering image, a controller for activating a user function registered as an associated function of the camera when the camera captures the gathering image, and for performing the activated user function based on the gathering image, and a display panel for displaying the gathering image.

Performing the registered user function may include, if the registered user function is a photo transfer function, automatically activating a radio frequency unit when the camera captures the gathering image and displaying a screen for sending the gathering image to other portable devices on the display panel.

Performing the registered user function may include, if the registered user function is a photo classification function, automatically displaying a menu, including a plurality of folders for classifying photos, on the display panel when the gathering image is captured, and moving the gathering image to a specific folder when an input signal for designating the gathering image in the specific folder is generated.

Performing the registered user function may include, if the registered user function is a phonebook association function, automatically displaying a menu, including at least one folder included in a phonebook, when the gathering image is captured, displaying phonebook items, included in a specific folder, on the display panel along with the gathering image when an input signal for designating the gathering image in the specific folder is generated, and designating the gathering image as a representative image of a specific phonebook item when an input signal for designating the gathering image as the specific phonebook item is generated.

Performing the registered user function may include, if the registered user function is a gathering image display function, resizing the gathering image to a preset size, to display the resized gathering image in a screen, and displaying the resized gathering image as a wallpaper of a specific screen when a specific input signal is generated.

Performing the registered user function may include, if the registered user function is an icon association function, resizing the gathering image to a preset size when a specific input signal is generated after the gathering image is captured and simultaneously displaying a screen, including at least one icon, on the display panel, and to registering the resized gathering image as an image of a relevant icon when an input signal for designating the resized gathering image in a specific icon is generated.

In accordance with the method of executing the fast association function of a camera and the portable device including the method according to the exemplary embodiments of the present invention, aspects of the present invention provide that an image captured by the camera is operated in conjunction with a user function of the portable device through a simple control operation.

Furthermore, aspects of the present invention provide convenient, rapid processing and operation of an image related to a user function of the portable device via the camera function.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 4 is an exemplary diagram of a screen for illustrating a phonebook association function while a fast association function of a camera is operated according to an exemplary embodiment of the present invention;

FIG. 7 is an exemplary diagram of a screen for illustrating an icon association function while a fast association function of a camera is operated according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted to for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
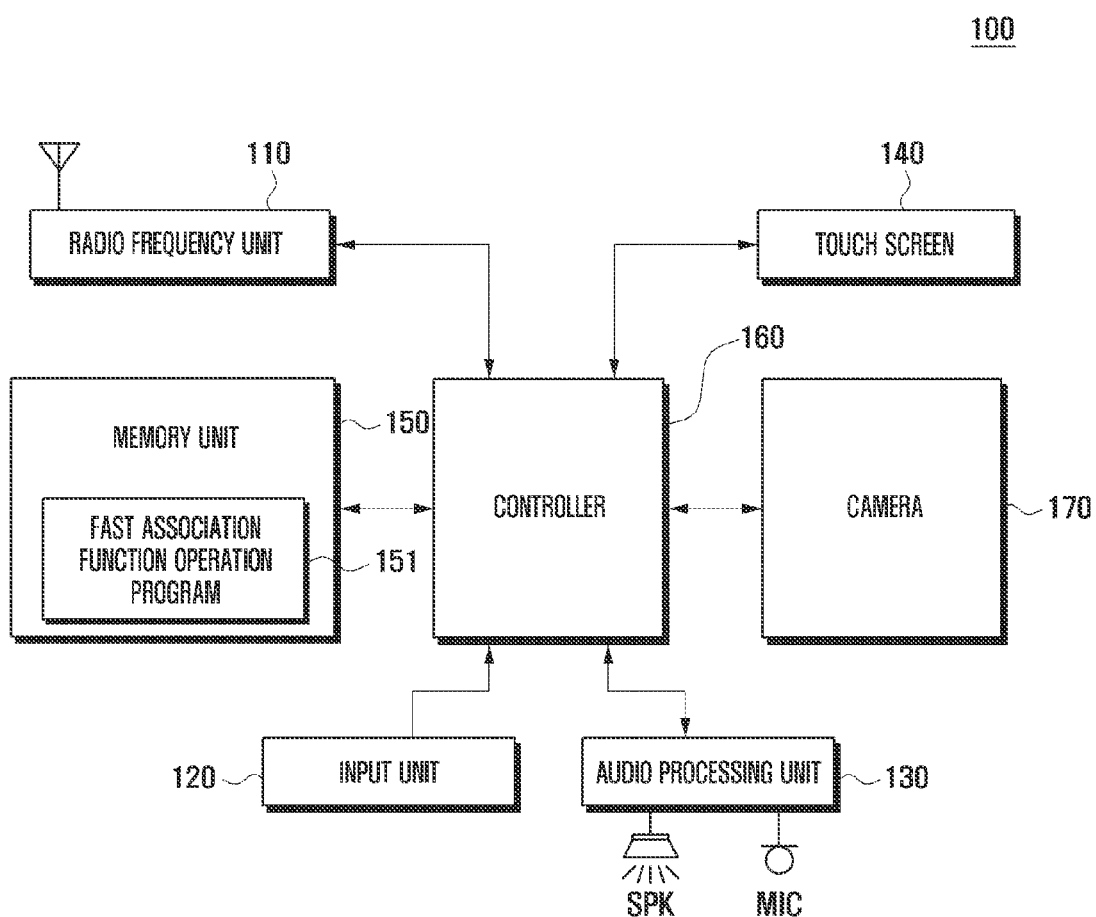
FIG. 1 is a diagram schematically showing the configuration of a portable device according to an exemplary embodiment of the present invention.

FIG. 1 is a diagram schematically showing a configuration of a portable device according to an exemplary embodiment of the present invention.

Referring to FIG. 1, the portable device 100 includes a radio frequency unit 110, an input unit 120, an audio processing unit 130, a touch screen 140, a memory unit 150, a camera 170, and a controller 160.

The portable device 100 supports previously registered user functions when an image is captured by the camera 170 so that the user functions may be executed rapidly. The portable device 100 may provide a function setting screen for setting a user function to be associated with the camera 170. If an image is captured by the camera 170, the portable device 100 may support a user function associated with a gathering image so that the user function can be rapidly executed. Each of the elements of the portable device 100 is described below.

The radio frequency unit 110 forms a communication channel with a base station for data communication and voice communication with other portable devices. The radio frequency unit 110 may include a radio frequency transmitter for performing up-conversion and amplification for the frequency of a transmitted signal, a radio frequency receiver for performing low-noise amplification and down-conversion for the frequency of a received signal, and the like.

The radio frequency unit 110 may be automatically activated when the fast association function of the camera is set and may send a gathering image, captured by the camera 170, to another portable device having an entered telephone number under the control of the controller 160. When the user sets a photo transfer function as the fast association function of the camera and photographs an image using the camera 170, the portable device 100 may output a screen (e.g., a telephone number entry screen) in which the user may input a command to send the captured gathering image to another portable device. When the user enters a specific telephone number, the radio frequency unit 110 may send a gathering image captured by the camera 170 to another portable device specified by the telephone number. The radio frequency unit 110 may be omitted if the portable device 100 does not support a mobile communication function.

The input unit 120 may include a number of input keys and function keys for receiving number or character information and for setting various functions. The function keys may include direction keys set to perform specific functions, side keys, hot keys, and the like. The input unit 120 may generate a key input signal related to the control of a function of the portable device 100 and send the generated key input signal to the controller 160.

The input unit 120 may generate various input signals for controlling the camera 170 according to user input. Based on the user's input, the input unit 120 may generate an input signal for registering a specific user function as the fast association function execution list of the camera, an input signal for activating the camera 170, an input signal for capturing an image based on the camera 170, an input signal for controlling the activation of a user function registered as an association function on the basis of a captured image, and the like. The input unit 120 may transfer the generated input signals to the controller 160.

The audio processing unit 130 outputs an audio signal, received through the radio frequency unit 110, or an audio signal generated when audio files stored in the memory unit 150 are played to a speaker SPK. The audio processing unit 130 also sends an audio signal, such as voice received from a microphone MIC, through the radio frequency unit 110 under the control of the controller 160. When a recording function is activated in a process of activating the camera 170, the audio processing unit 130 receives surrounding audio signals from the microphone MIC. The audio processing unit 130 may output a description of a user function, registered as the fast association function of the camera, as voice guidance according to a setting state. The output of the voice guidance may be omitted according to a setting of the portable terminal.

The touch screen 140 includes a display panel and a touch panel disposed on the display panel. The display panel displays various menu screens provided by the portable device 100, user data inputted by a user, function setting information, and information to be provided to the user, and the like. The touch screen 140 may be formed of a flat display device formed on the basis of thin film transistors, such as a Liquid Crystal Display (LCD) and Organic Light Emitted Diodes (OLED). The touch screen 140 may support an input function capable of generating specific input signals on the basis of the touch panel.

The touch screen 140 may output a variety of screens according to the execution of the fast association function of the camera according to an exemplary embodiment of the present invention. For example, the touch screen 140 may output a photo classification function support screen, a link function support screen, an image association function support screen, an image change function support screen, and the like. The photo classification function support screen enables the user to rapidly designate an image captured by the camera 170. The link function support screen enables the user to link an image, captured by the camera 170, to a previously stored item. The image association function support screen enables the user to associate an image, captured by the camera 170, with the image output function of the portable device 100. The image change function support screen enables the user to change an image, such as a menu, into an image captured by the camera 170. Each of the function support screens is described below with reference to FIGS. 3 to 7.

The memory unit 150 may store programs used to operate the functions of the portable device 100, data inputted through the input unit 120, data transmitted by other portable devices, images gathered by the camera 170, etc. The memory unit 150 may include a program region and a data region.

The program region may store an Operating System (OS) for controlling the operations of the portable device 100, application programs used to play multimedia content, and the like. The program region may store the fast association function operation program 151 of the camera 170 and the fast association function setting operation program of the camera 170 according to an exemplary embodiment of the present invention.

The fast association function operation program 151 of the camera 170 is a program for immediately executing a gathering image, captured by the camera 170, in association with a specific user function. The fast association function operation program 151 of the camera 170 is loaded into the controller 160 when the camera 170 is activated and set to execute the fast association function of the camera according to an exemplary embodiment of the present invention.

The fast association function operation program 151 of the camera 170 may include a routine for identifying a user function registered as an association function when the camera 170 is activated; a function activation routine for gathering an image of a subject when a shutter key for the image gathering of the camera 170 is entered, outputting the gathering image to the touch screen 140, and activating the registered user function as the fast association function of the camera; and a function application routine for applying the gathering image to a relevant association function in response to an input signal received through the input unit 120 or the touch screen 140. The function activation routine may adjust the size of the gathering image in order to output a menu, corresponding to the association function, to the touch screen 140. For example, when the camera 170 photographs an image, the function activation routine may output the captured gathering image to the entire screen for a certain period of time, adjust the size of the gathering image after a lapse of some time, place the adjusted image in a specific portion of the screen, and output a menu, corresponding to the association function, to one side of the screen. The function of outputting the captured gathering image for a certain period of time may be changed into the time when a specific input signal is inputted through the input unit 120.

The fast association function setting operation program of the camera 170 is a program for setting an association function registered as the execution of the fast association function of the camera. The fast association function setting operation program of the camera 170 may include a routine for allocating an icon or hot key for outputting an association function setting screen, a routine for outputting the association function setting screen to the touch screen 140 when the icon or hot key is activated, and a routine for registering an association function, designated by the input unit 120 and the touch screen 140, as the fast association function of the camera 170.

The data region is a region in which data generated when the portable device 100 is used is stored. The data region may store a phonebook, audio data, relevant content, information corresponding to user data, and the like. The data region may store images gathered by the camera 170. The data region may also store a user function list registered as the fast association function of the camera 170, information in which gathering images are linked to each association function and so on.

The camera 170 captures an image of a subject and provides the captured and gathering image. The camera 170 may be activated in response to a signal generated from the input unit 120 or the touch screen 140 and configured to gather the image. The camera 170 may include a camera sensor, an image signal processor, and a Digital Signal Processor (DSP). The camera sensor converts an optical signal into an electrical signal. The image signal processor converts an analog video signal into a digital video signal. The DSP performs image processing (e.g., scaling, noise cancellation, conversion into a Red Green Blue (RGB) signal, etc.) for a video signal outputted from the image signal processor in order to display the video signal on the touch screen 160. The camera sensor may include a Charge-coupled Device (CCD) sensor, a Complementary Metal-Oxide Semiconductor (CMOS) sensor, or the like. The camera 170 may maintain the output of a captured image for a certain period of time under the control of the controller 160 so that the camera 170 can be operated in conjunction with a specific user function of the portable device 100 in the activation process.

The controller 160 controls the general operation of the portable device 100, the flow of signals between the internal blocks, a data processing function, and the like. The controller 160 activates the camera 170 in response to a signal generated from the input unit 120 and the touch screen 140, and activates a user function registered as the fast association function of the camera when the camera 170 gathers an image so that the gathering image may be operated in conjunction with the registered user function. The controller 160 outputs a menu for operating a user function, registered as the fast association function of the camera 170, to the display panel on which a gathering image is outputted automatically or according to a user input when the camera 170 gathers the image. The controller 160 may apply the gathering image to the function of a selected menu item in response to an input signal so that a task supported by a relevant association function can be performed. The process of activating and applying the association functions under the control of the controller 160 is described below with reference to exemplary screens.

As described above, the portable device 100 according to an exemplary embodiment of the present invention may perform a previously registered user function in association with an image gathered by the camera 170 rapidly and conveniently. Accordingly, the portable device 100 may support not only the function of storing images captured by the camera 170, but also functions associated with various user functions supported by the portable device 100 more conveniently and easily.

Figure 2:
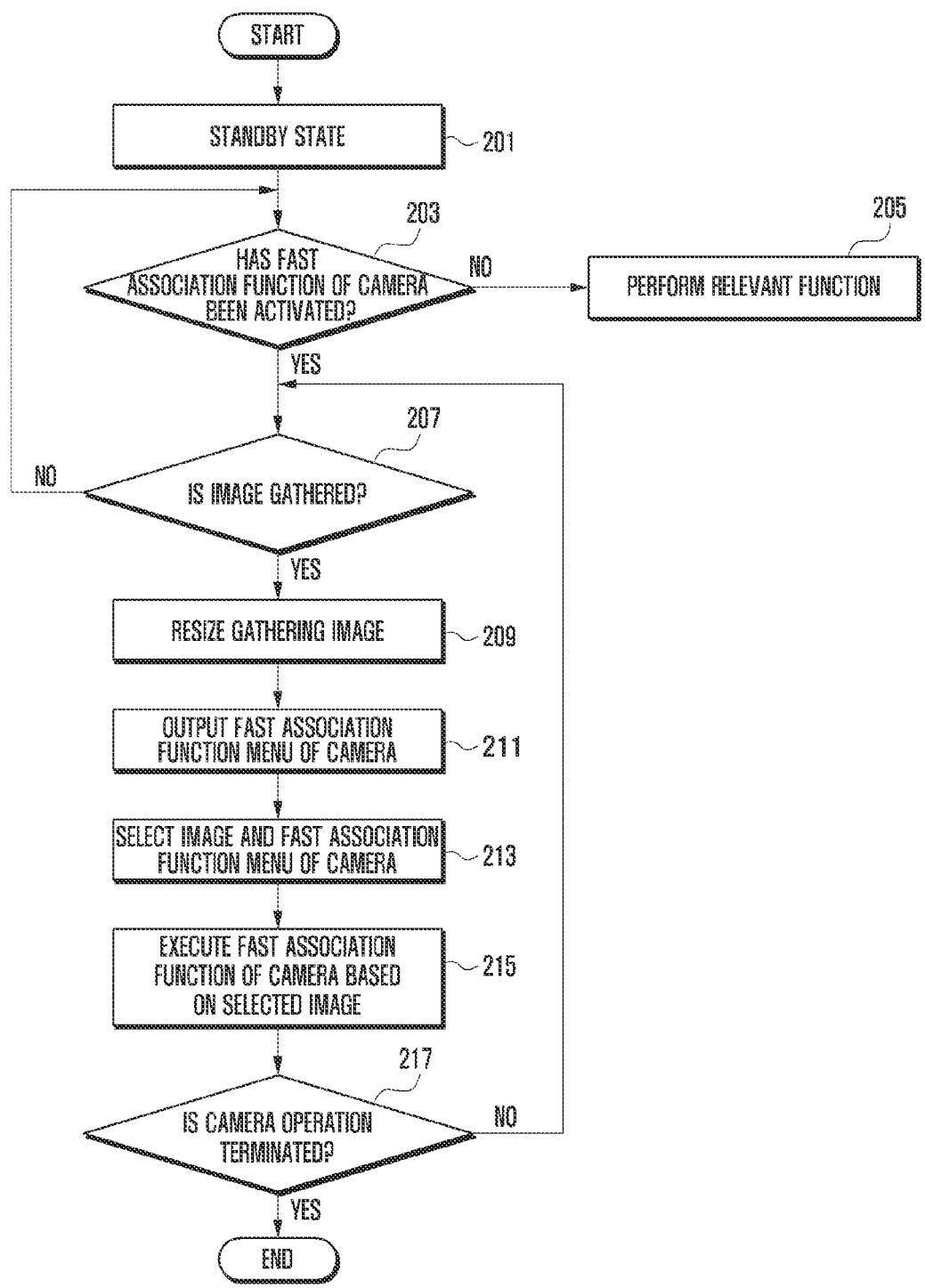
FIG. 2 is a flowchart illustrating a method of executing a fast association function of a camera according to an exemplary embodiment of the present invention.

FIG. 2 is a flowchart illustrating a method of executing a fast association function of a camera according to an exemplary embodiment of the present invention.

Referring to FIG. 2, when power is supplied to the portable device 100, the controller 160 resets each of the elements of the portable device 100 using the supplied power. After the reset process is terminated, the controller 160 outputs a standby screen to the display panel based on preset schedule information in step 201.

The controller 160 determines whether an input signal for activating the camera function is generated in step 203. If the generated input signal is not an input signal for activating the camera function, the controller 160 performs a user function corresponding to the generated input signal in step 205. For example, the controller 160 may support the execution of a user function corresponding to the generated input signal, such as a file search function, a file transfer function, a call function, an Internet function, and a file play function which are supported by the portable device 100.

If, as a result of the determining in step 203, the input signal for activating the camera function is generated, the controller 160 may control to activate the camera 170 and to output a screen for operating the camera 170 to the display panel. The controller 160 determines whether an input signal for gathering an image is generated in step 207. If, as a result of the determination, the input signal for gathering an image is not generated, the controller 160 returns to step 203 while continuing to output the screen according to the activation of the camera 170 or a preview image. If, as a result of the determination at step 207, an input signal for terminating the function of the camera 170 is generated, the controller 160 may return to step 201 of displaying the standby screen along with terminating the function of the camera 170.

If, as a result of the determination, the input signal for gathering an image is generated, the controller 160 resizes the gathering image in step 209. The controller 160 may reduce the size of the gathering image to a preset size, automatically move the gathering image to a specific position of the display panel, and/or display the moved image. The controller 160 displays the fast association function menu of the camera 170 in the display panel in step 211. The controller 160 may determine whether a user function is registered as the fast association function menu of the camera 170 by searching the memory unit 150 and activate the registered user function if the registered user function exists. The controller 160 may identify a menu for supporting the user function registered as the association function and output the menu to the display panel of the touch screen 140. However, if a user function registered as the fast association function of the camera does not exist, the controller 160 may support a common camera function (e.g., a function of automatically storing a captured image).

When an input signal for selecting the image outputted to the display panel of the touch screen 140 and an input signal for selecting a specific item in the fast association function menu of the camera are generated in step 213, the controller 160 executes the fast association function menu item of the camera 170 based on the selected and gathering image in response to the relevant input signal in step 215. The controller 160 may operate a variety of user functions in conjunction with the gathering image according to the types of previously registered user functions. For example, if a photo transfer function is previously registered as the association function, the controller 160 may send the gathering image to a specific portable device through the above processes. If a photo classification function is previously registered as the association function, the controller 160 may output various types of folders for storing images to the display panel of the touch screen 140 and immediately designate a photo to a specific folder according to a user choice. If a photo display function is previously registered as the association function, the controller 160 may immediately output the gathering image to the standby screen or replace the gathering image with an image of a specific icon.

The controller 160 determines whether an input signal for terminating the operation of the camera 170 is generated in step 217. If, as a result of the determination at step 217, the input signal for terminating the operation of the camera 170 is not generated, the controller 160 may return to step 207. If, as a result of the determination at step 217, the input signal for terminating the operation of the camera 170 is generated, the controller 160 may return to step 201 without performing a termination process.

As described above, in the method of executing the fast association function of the camera according to exemplary embodiments of the present invention, the user function of the portable device 100 which may be associated with an image gathered by the camera 170 can be rapidly performed without additional search. Accordingly, the user may operate the camera 170 more widely using the above method and perform photo classification and processing tasks more conveniently in the process of operating the camera 170.

A screen interface related to the execution of the fast association function of the camera 170, supported by the portable device 100, is described below with reference to FIG. 3.

Figure 3:
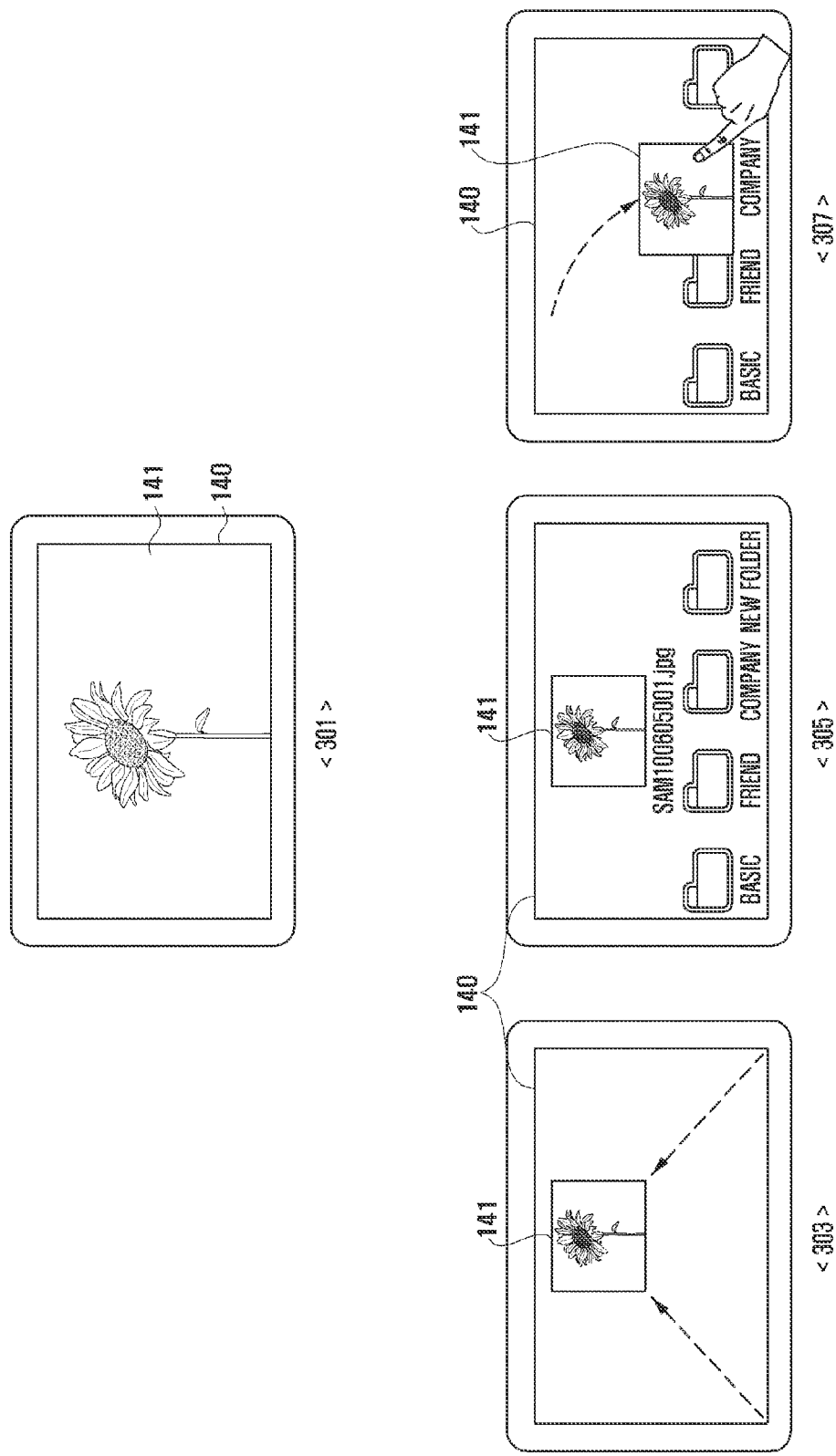
FIG. 3 is an exemplary diagram of a screen for illustrating a photo classification function while a fast association function of a camera is operated according to an exemplary embodiment of the present invention.

FIG. 3 is an exemplary diagram of a screen for illustrating a photo classification function while a fast association function of a camera is operated according to an exemplary embodiment of the present invention.

Referring to FIG. 3, in the photo classification function while the fast association function of the camera 170 is operated, when the user generates an input signal for activating the camera 170, the controller 160 may activate the camera 170, gather a preview image, and output the preview image to the display panel of the touch screen 140. If the user inputs a command to gather a captured image of a subject, the portable device 100 may output the gathering image 141 to the display panel of the touch screen 140 as in a screen 301. The portable device 100 may output the gathering image 141 to the entire screen of the display panel of the touch screen 140 for a certain period of time.

The portable device 100 may adjust the size of the gathering image 141, outputted to the display panel of the touch screen 140, to a specific size as in a screen 303 and display the adjusted gathering image 141 in a specific position of the screen 303. The size of the gathering image 141 adjusted by the portable device 100 may be adjusted according to the size of the fast association function menu of the camera 170, the number of items of a menu, and the like, which are outputted in a screen 305. The portable device 100 may adjust the size of the gathering image 141 outputted to the screen 301 differently and place the gathering image 141 in the screen 301 differently according to the type or characteristic of a user function registered as the fast association function of the camera 170.

When the resizing and placement of the gathering image 141 in the screen 303 are terminated, the portable device 100 may output the fast association function menu of the camera 170 to one side of the screen as in a screen 305. The resized gathering image 141 may be placed in the upper center of the screen, and a plurality of folders for supporting the photo classification function in the fast association function menu of the camera 170, such as "Basic," "Friend", "Company", and "New folder" may be displayed on the lower side of the screen 305. The number of folders and the names of the folders may be changed according to a user characteristic or a change of the setting of the portable device 100. In the screen 305, the user may operate a folder creation function using the input unit 120 of the portable device 100.

When the user designates the resized gathering image 141 and drags the resized gathering image 141 to a specific folder (e.g., the "Company" folder) as in a screen 307, the gathering image 141 is moved to the "Company" folder, and the photo classification task is terminated.

Although not shown, the portable device 100 may output an icon, corresponding to a return button or a cancel button, on the display panel of the touch screen 140 or allocate a return function to a specific key. If the user wants to cancel the photo classification task for the gathering image 141, the user may operate the portable device 100 so that it returns to the photographing function of the camera 170 by manipulating the icon or the specific key.

Furthermore, the portable device 100 supports a change in the type of a user function registered as the fast association function of the camera 170. To this end, the portable device 100 may output a specific key or a specific icon to one side of a screen. When a user operates the specific icon or the specific key, the portable device 100 may output a list of other user functions to the display panel of the touch screen 140. When the user selects a user function from the list, the portable device 100 may automatically register the selected user function as the fast association function when the camera subsequently gathers an image.

As described above, in the photo classification function while the fast association function of the camera 170 of the portable device 100 according to an exemplary embodiment of the present invention is operated, the user may immediately designate a captured image to a desired folder and store the captured image in the relevant folder. The portable device 100 may provide the fast association function setting screen of the camera 170 so that the gathering image 141 can be operated in conjunction with other user functions. Accordingly, the user may rapidly search for a specific user function through the fast association function setting screen of the camera, set the specific user function as an association function, and operate a captured gathering image easily and rapidly on the basis of the association function.

FIG. 4 is an exemplary diagram of a screen for illustrating a phonebook association function while a fast association function of a camera is operated according to an exemplary embodiment of the present invention. In FIG. 4, it is assumed that the portable device 100 has received an input signal for gathering a specific image with the camera 170 being activated. It is also assumed that the portable device 100 has registered an association function with the phonebook function as the fast association function of the camera.

Referring to FIG. 4, the portable device 100 may perform the resizing and placement of a gathering image 141 captured by the camera 170 and then output a plurality of folders, included in the phonebook, to the display panel of the touch screen 140. In this state, the user may select the resized and placed gathering image 141 and drag the resized and placed gathering image 141 to a specific folder (e.g., a "Company" folder) as in a screen 401.

Accordingly, the portable device 100 may drag the gathering image 141 so that a phonebook list included in the "Company" folder is outputted as in a screen 403. The portable device 100 may output the gathering image 141 to one side of the screen (e.g., on the upper right side). The gathering image 141 may be placed at a position where a portion overlapped with the phonebook list is a minimum.

While both the phonebook list and the gathering image 141 are outputted, the user may designate the gathering image 141 and drag the gathering image 141 over a specific item so that it overlaps with the specific item, as in a screen 405. When the drag operation is terminated and a specific item 143 is selected as the gathering image 141, the portable device 100 may apply the gathering image 141 to the specific item 143. For example, the portable device 100 may link the gathering image 141 to the specific item 143 of the phonebook list as a representative image. Accordingly, when a telephone call is received from the user of a portable device pertinent to the specific item 143 or a telephone call is attempted at a portable device pertinent to the specific item 143, the linked gathering image 141 may be outputted to the display panel of the touch screen 140 as a representative image of the specific item 143. If a previously registered representative image exists in the specific item 143, the portable device 100 may output a message indicating that the representative image exists, before the gathering image 141 is updated into the representative image. Alternatively, the portable device 100 may directly register the gathering image 141 as a representative image of the specific item 143 without outputting an additional message.

As described above, in the association function with the phonebook function while the fast association function of the camera according to an exemplary embodiment of the present invention is operated, a number of the gathering images 141 may be registered and updated rapidly and conveniently in association with specific items included in the phonebook. The specific items are illustrated as a phonebook list included in the phonebook, but exemplary embodiments of the present invention are not limited thereto. The gathering image 141 may be associated with any of various data stored in the memory unit 150. Accordingly, the gathering image 141 may be linked with specific data pertinent to a user function registered as the fast association function execution menu of the camera 170.

Figure 5:
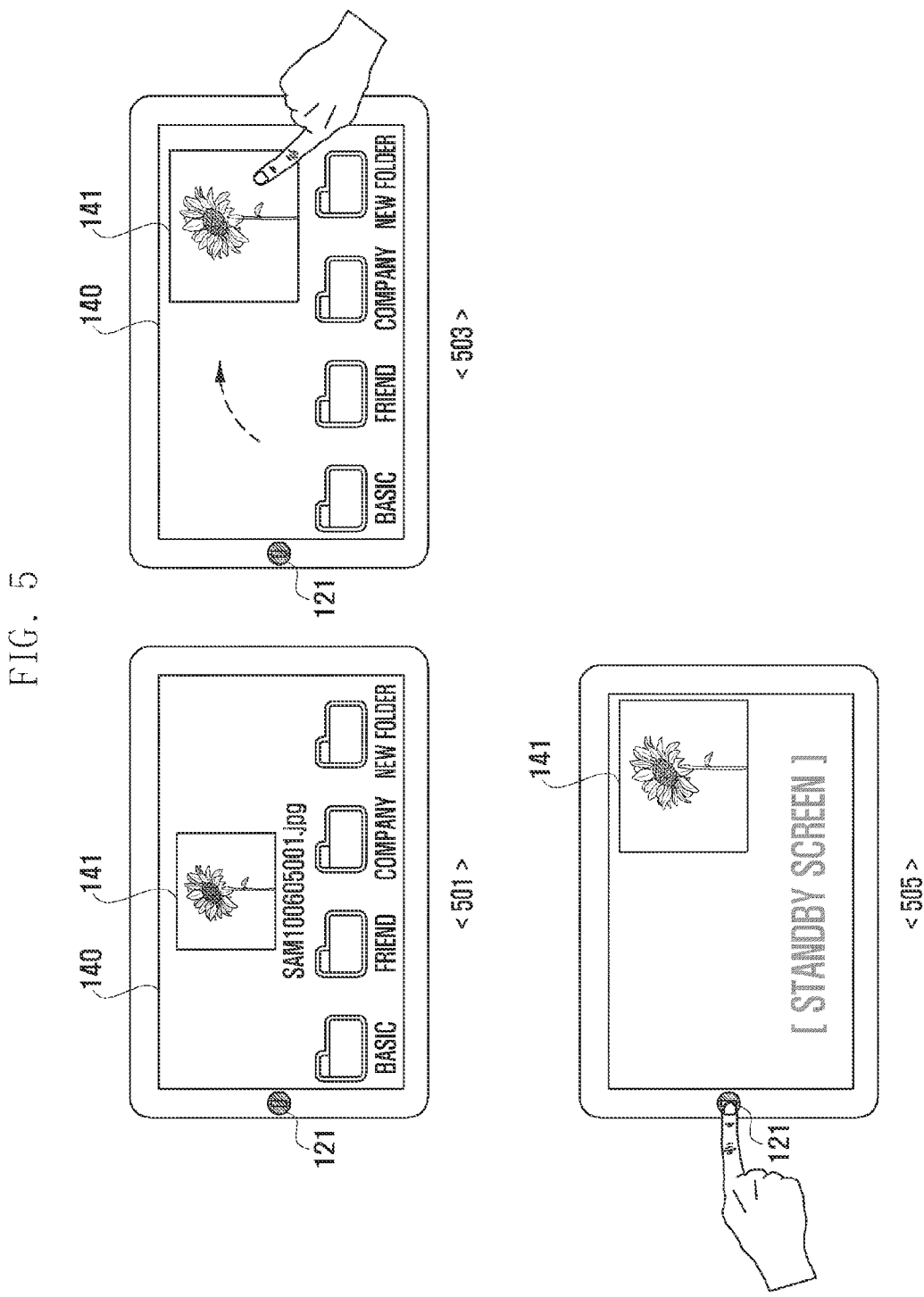
FIG. 5 is an exemplary diagram of a screen for illustrating an image display function while a fast association function of a camera is operated according to an exemplary embodiment of the present invention.

FIG. 5 is an exemplary diagram of a screen for illustrating an image display function while a fast association function of a camera is operated according to an exemplary embodiment of the present invention.

Referring to FIG. 5, the portable device 100 may have captured an image of a subject with the camera 170 being activated and have outputted the captured gathering image 141 to the display panel of the touch screen 140. The portable device 100 may output a plurality of folders to one side of a screen when the photo classification function registered as the fast association function menu of the camera is executed. The portable device 100 may output the gathering image 141 to one side of a screen and also output menu items according to the activation of the user function registered as the fast association function of the camera 170, as in a screen 501.

The user may request the image display function for decorating a screen by outputting the gathering image 141 to a standby screen without performing the photo classification function previously registered. The user may generate an input signal for moving the gathering image 141 to a desired position on the screen. The portable device 100 may move the gathering image 141 to the desired position when the input signal is generated and display the gathering image 141 as in a screen 503.

The user of the portable device 100 may generate a specific input signal for outputting the gathering image 141 to the display panel of the touch screen 140 in association with a specific user function. For example, the user may instruct the portable device 100 to perform a "Today screen image setting function" for outputting the gathering image 141 to the display panel by operating a hot key 121 provided in the portable device 100. In response thereto, the portable device 100 may perform a today screen image function for setting the gathering image 141 as a display image of a specific screen (e.g., the standby screen) as in the screen 503. The today screen image function may correspond to a function for outputting an image set by a user as the standby screen or at least some image of the wallpaper of a specific screen selected by a user so that the screen can be decorated. Accordingly, a screen 505 may become the standby screen of the gathering image 141 which is outputted as the wallpaper. The standby screen may include a menu screen for outputting specific menu items or widget items on the upper layer of the gathering image 141 according to user control or the setting of the portable device 100.

The position of the gathering image 141 designated in the screen 503 may be determined as the position in the image display function screen according to the today screen image function. The position of the gathering image 141 designated in the screen 503 may be determined as the position of the wallpaper in a screen 505. Accordingly, the portable device 100 may support a menu scaling function, such as that shown in FIG. 6, so that the position of the gathering image 141 can be easily controlled.

Figure 6:
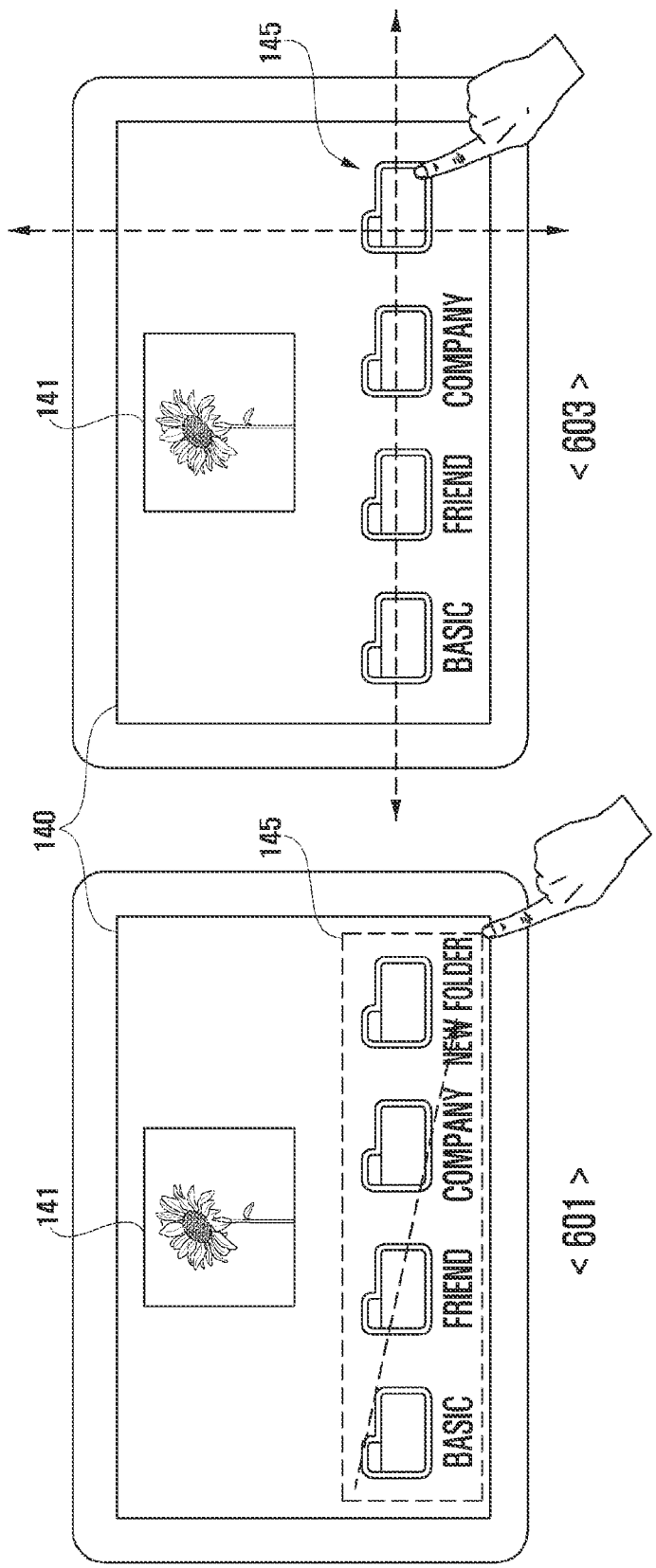
FIG. 6 is an exemplary diagram of a screen for illustrating a menu scaling function while a fast association function of a camera is operated according to an exemplary embodiment of the present invention.

FIG. 6 is an exemplary diagram of a screen for illustrating a menu scaling function while a fast association function of a camera is operated according to an exemplary embodiment of the present invention.

Referring to FIG. 6, the portable device 100 enables the fast association function menu 145 of the camera to be removed from the touch screen 140 when a specific input signal is generated, as in a screen 601. When the user generates a specific touch event (e.g., a drag event across a diagonal line) on the fast association function menu 145 of the camera as shown, the portable device 100 may stop displaying the fast association function menu 145 of the camera on the touch screen 140 or may reduce the size of the fast association function menu 145 according to the relevant touch event. Accordingly, the user may move the gathering image 141 to a specific position while the fast association function menu 145 of the camera is not displayed on the touch screen 140 or is reduced in size.

The portable device 100 may change the position of the fast association function menu 145 of the camera on the touch screen 140, as in a screen 603. The user may generate a touch event to designate a specific point of the fast association function menu 145 of the camera and may move the fast association function menu 145 of the camera to a desired position through a drag with the touch event remained intact. For example, when the user drags the fast association function menu 145 of the camera upwards with the fast association function menu 145 being designated, the fast association function menu 145 of the camera may be moved up in response to a drag event and then displayed on the touch screen 140. When the user moves the fast association function menu 145 of the camera to the left, at least part of the fast association function menu 145 of the camera may be removed from the screen.

If the fast association function menu 145 of the camera overlaps with the gathering image 141 in the process of the fast association function menu 145 being moved, the portable device 100 may classify the gathering image 141 and the fast association function menu 145 of the camera into different layers and display the appropriate upper layer. The portable device 100 may display the fast association function menu 145 of the camera in an active state, which is now selected, and to display the gathering image 141 in an inactive state. If the user generates an input signal for selecting the gathering image 141, moves the gathering image 141 to any one folder of the fast association function menu 145 of the camera, and then overlaps the gathering image 141 with the relevant folder, the portable device 100 may execute the photo classification function described with reference to FIG. 3.

FIG. 7 is an exemplary diagram of a screen for illustrating an icon association function while a fast association function of a camera is operated according to an exemplary embodiment of the present invention.

Referring to FIG. 7, the camera 170 is activated in response to an input signal generated by a user. When a gathering image 141 is obtained by photographing a subject using the camera 170, the portable device 100 may resize the gathering image 141 and output the resized gathering image 141 on one side of a screen as in a screen 701.

When a preset input signal is generated (e.g., a specific touch event is generated on the touch screen 140 to which the gathering image 141 is outputted) with the gathering image 141 being outputted to the touch screen 140, the portable device 100 may automatically perform the icon association function. The icon association function is a function of replacing the gathering image 141 with an image of a specific icon. The portable device 100 may output a screen (e.g., a menu screen), including a variety of icons, as in a screen 703. The portable device 100 may resize the gathering image 141 according to the size of the icons and output the gathering image 141 to a preset position (e.g., a specific position where the gathering image 141 and the icons can be distinguished from each other).

The user may generate an input signal for selecting the gathering image 141 and then generate an input signal for selecting a specific icon 147, designating the gathering image 141 as an icon image, as in a screen 705. For example, the user may select the gathering image 141 and then generate an input signal for dragging the selected gathering image 141 to a position where the specific icon 147 is placed and overlapping the gathering image 141 with the position. In response thereto, the portable device 100 may change the relevant gathering image 141 into an image of the specific icon 147 as in a screen 705.

As described above, the portable device 100 according to exemplary embodiments of the present invention may activate the icon association function for changing the gathering image 141 into the image of the specific icon 147 when a preset input signal is generated. The touch event for the gathering image 141 is described as an example of the input signal for activating the icon association function is described as in the screen 701, but exemplary embodiments of the present invention is not limited thereto. When a specific key input signal or a specific touch event is generated, the portable device 100 may output the screen 703 so that the icon association function is executed.

As described above, the method of executing the fast association function of a camera and the portable device supporting the method according to exemplary embodiments of the present invention enable rapid execution of a variety of user functions supported by the portable device 100 based on an image gathered by the camera 170. Accordingly, convenience when a portable device using a camera is used can be improved, and more user needs can be satisfied.

The portable device 100 may further include elements not described above, such as a local area communication module for local area communication, an interface for enabling the portable device 100 to send and receive data according to a wired communication method or a wireless communication method, an Internet communication module for performing an Internet function over an Internet network, and a digital broadcasting module for performing a function of receiving and playing digital broadcasting. The elements may not be all enumerated because they are modified in various ways according to the convergence trend of digital devices, but elements equivalent to the above-described elements may be further added to the terminal. Furthermore, it is to be noted that the portable device 100 may omit some of the elements from the configuration or may replace some of the elements with other elements. This may be easily understood by a person having ordinary skill in the art.

The portable device 100 according to the exemplary embodiment of the present invention may be any type of device supporting a data communication function via a base station, and may include a Subscriber Identity Module (SIM). For example, the portable device 100 may include a mobile communication terminal operated in accordance with communication protocols corresponding to various communication systems, information communication devices, and multimedia devices, such as a Portable Multimedia Player (PMP), a digital broadcasting player, a Personal Digital Assistant (PDA), a music player, a handheld game terminal, a smart phone, a notebook computer, and a handheld Personal Computer (PC), and application devices for the information communication devices and multimedia devices.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A portable device supporting an execution of a fast association function of a camera, the portable device comprising:
   a camera configured to capture an image;
   a display panel; and
   a controller configured to:
      activate, when the camera captures the image, the fast association function of the camera, the fast association function of the camera being a specific user function which is preset to be automatically activated without a user's input when the camera captures the image;
      activate a radio frequency unit for sending the captured image; and
      control the display panel to display a screen for sending the captured image to at least one other portable device on the display panel based on the specific user function,
   wherein the specific user function is a photo transfer function, and
   wherein the displayed screen is a telephone number entry screen allowing a user to enter a telephone number, such that the captured image is sent to the at least one other portable device based on the entered telephone number.

2. The portable device of claim 1, wherein the display panel is configured to display a menu for the fast association user function along with the captured image.

3. The portable device of claim 2, wherein the captured image is resized to a preset size when the camera captures the image, together with the menu, is displayed on the display panel.

4. The portable device of claim 2, wherein a size and position of the captured image displayed on the display panel, are controlled differently according to a size of the menu and a number of items included in the menu.

5. The portable device of claim 2, further comprising:
   a touch screen including an input unit for generating an input signal to designate the captured image and a specific item of the menu; or
   a touch panel disposed over the display panel for generating a touch event designating the captured image and a specific item of the menu.

6. The portable device of claim 1, further comprising:
   a memory unit configured to store at least one user function registered as the associated function of the camera and the captured image.

7. The portable device of claim 1, wherein the display panel is configured to display at least one of:
   a fast association function setting screen of the camera for setting the specific user function so that the specific user function is operated along with the captured image; and
   a user function list for enabling a user to select the specific user function associated with the camera.

8. The portable device of claim 7, wherein, when the specific user function is selected from the user function list, the controller automatically is configured to set the specific user function as the associated function of the camera.

9. The portable device of claim 1, wherein the controller is further configured to receive an indication of a change of the specific user function, and
   wherein:
      when the specific user function is a phonebook association function, the controller is configured to:

control the display panel to automatically display a menu, including at least one folder included in a phonebook, when the camera captures the image;
control the display panel to display phonebook items, included in a specific folder, on the display panel along with the captured image when an input signal for designating the captured image in the specific folder is generated; and
designate the captured image as a representative image of a specific phonebook item when an input signal for designating the captured image as the specific phonebook item is generated; and
when the fast association user function is an icon association function, the controller is configured to:
resize the captured image to a preset size when a specific input signal is generated and simultaneously control the display panel to display a screen including at least one icon, on the display panel; and
set the resized image as an image of a relevant icon when an input signal for designating the resized image in a specific icon is generated.

10. The portable device of claim 1, wherein the controller is further configured to receive an indication of a change of the specific user function,
wherein the controller is further configured to:
resize the captured image to a preset size, control the display panel to display the resized image in a screen; and
control the display panel to display the resized image as a wallpaper of a specific screen when a specific input signal is generated based on the specific user function, and
wherein the specific user function is a captured image display function.

11. A method of executing a fast association function of a camera, the method comprising:
activating the camera;
capturing an image using the camera;
activating, when the camera captures the image, the fast association function of the camera, the fast association function of the camera being a specific user function which is preset to be automatically activated without user's input when the camera captures the image;
activating a radio frequency unit for sending the captured image based on the specific user function;
displaying a screen for sending the captured image to at least one other portable device on a display panel based on the specific user function; and
performing the activated fast association function based on the captured image,
wherein the specific user function is a photo transfer function, and
wherein the displayed screen is a telephone number entry screen allowing a user to enter a telephone number, such that the captured image is sent to the at least one other portable device based on the entered telephone number.

12. The method of claim 11, further comprising:
displaying a menu for the fast association user function along with the captured image.

13. The method of claim 12, wherein the displaying of the menu comprises resizing the captured image to a preset size.

14. The method of claim 12, wherein the displaying of the menu comprises:
controlling a size and position of the captured image, displayed on the display panel, differently according to a size of the menu and a number of items included in the menu.

15. The method of claim 12, further comprising:
receiving an input signal designating a specific item to be operated together with the captured image, from among a plurality of menu items, if the menu includes the menu items.

16. The method of claim 11, further comprising:
setting the specific user function as the associated function of the camera.

17. The method of claim 11, further comprising:
displaying a user function list including at least one user function to be operated in conjunction with the captured image when the camera captures the image.

18. The method of claim 17, further comprising:
automatically setting the specific user function as the associated function of the camera, when the specific user function is selected from the user function list.

19. The method of claim 11, further comprising:
receiving an indication of a change of the specific user function;
when the specific user function is a photo classification function, automatically displaying a menu, including a plurality of folders for classifying photos, on the display panel when the camera captures the image, and moving the captured image to a specific folder when an input signal for designating the captured image in the specific folder is generated;
when the specific user function is a phonebook association function, automatically displaying a menu, including at least one folder included in a phonebook, when the camera captures the image, displaying phonebook items, included in a specific folder, on the display panel along with the captured image when an input signal for designating the captured image in the specific folder is generated, and designating the captured image as a representative image of a specific phonebook item when an input signal for designating the captured image as the specific phonebook item is generated;
when the specific user function is a captured image display function, resizing the captured image to a preset size, displaying the resized image in a screen, and outputting the resized image as a wallpaper of a specific screen when a specific input signal is generated; and
when the specific user function is an icon association function, resizing the image to a preset size when a specific input signal is generated after the camera captures the image and simultaneously displaying a screen including at least one icon on the display panel, and setting the resized image as an image of a relevant icon when an input signal for designating the resized image in a specific icon is generated.

* * * * *